US006823470B2

(12) United States Patent
Smith et al.

(10) Patent No.: US 6,823,470 B2
(45) Date of Patent: Nov. 23, 2004

(54) METHOD AND APPARATUS FOR CORRECTING DATA

(75) Inventors: Douglas Edward Smith, Westford, MA (US); Howard C. Reeve, III, North Andover, MA (US); James T. Francis, Jr., Merrimack, NH (US)

(73) Assignee: Sycamore Networks, Inc., Chelmsford, MA (US)

( * ) Notice: Subject to any disclaimer, the term of this patent is extended or adjusted under 35 U.S.C. 154(b) by 561 days.

(21) Appl. No.: 09/780,527

(22) Filed: Feb. 9, 2001

(65) Prior Publication Data

US 2002/0016933 A1 Feb. 7, 2002

Related U.S. Application Data

(60) Provisional application No. 60/182,927, filed on Feb. 16, 2000.

(51) Int. Cl.[7] .................................................. G06F 11/00
(52) U.S. Cl. ................................. 714/4; 714/18; 714/20
(58) Field of Search ............................... 714/4, 18, 20, 714/750, 757, 758, 777

(56) References Cited

U.S. PATENT DOCUMENTS

| 6,163,872 | A | * | 12/2000 | Wolf ........................... 714/776 |
|---|---|---|---|---|
| 6,185,247 | B1 | * | 2/2001 | Williams et al. ............. 375/212 |
| 6,519,738 | B1 | * | 2/2003 | Derby .......................... 714/781 |
| 6,530,057 | B1 | * | 3/2003 | Kimmitt ...................... 714/758 |
| 6,542,934 | B1 | * | 4/2003 | Bader et al. ................. 709/239 |
| 6,543,001 | B2 | * | 4/2003 | LeCrone et al. ................ 714/6 |
| 6,543,014 | B1 | * | 4/2003 | Okuyama et al. ............ 714/712 |
| 6,564,337 | B1 | * | 5/2003 | Yoneda et al. .................. 714/4 |
| 6,581,166 | B1 | * | 6/2003 | Hirst et al. ...................... 714/4 |
| 6,601,210 | B1 | * | 7/2003 | Kagan ......................... 714/758 |

* cited by examiner

*Primary Examiner*—Nadeem Iqbal
*Assistant Examiner*—Timothy M Bonura
(74) *Attorney, Agent, or Firm*—Wolf, Greenfield & Sacks, P.C.

(57) ABSTRACT

A system and method is provided for using a first data channel to pass working data and a second data channel to pass error correction information. For example, this second data channel may be defined along a redundant data path. For example, this error correction information may be forwarded error correction (FEC) information such as Hamming code information or any other type of error correction information. Use of the redundant path to forward FEC information provides several advantages: 1) the FEC information can be used to correct bit errors that occur within the system, making the system high-quality and more reliable and 2) use of the protected path provides an efficient method to constantly monitor the quality of both the working and redundant path. Monitoring is accomplished by using the FEC information on the redundant path in conjunction with the information on the working path to accurately count the number of errors that occur on the working and redundant paths. Information provided by monitoring can then be used to diagnose problems on the working path, so that the problems can be fixed before there is a need for the communication system to switch over to the redundant path.

46 Claims, 10 Drawing Sheets

METHOD AND APPARATUS FOR CORRECTING DATA

RELATED APPLICATIONS

This application claims the benefit under Title 35 U.S.C. §119(e) of U.S. Provisional Application Ser. No. 60/182,927, filed Feb. 16, 2000, entitled "LOCAL ERROR TRANSPORT CORRECTION" by James T. Francis, Jr., et al., the contents of which are incorporated herein by reference.

FIELD OF THE INVENTION

The invention relates generally to network communication systems, and more particularly to the correction of data communicated by such systems.

BACKGROUND OF THE RELATED ART

Communication systems are generally used to transmit information between entities that use such information. Such communication systems may be any system that transmits or receives information such as voice data, video data, or data for use by an entity. An entity may be, for example, a computer, networking device, telephone or other device, that receives and transmits information to another entity.

Such information or data is generally transmitted over a network. A network may include, for example, a communication channel upon which signals are transmitted and received. This communication channel may include one or more transmission media, such as copper or fiber optic cable, air, or other medium suitable for transmitting and/or receiving data between entities.

A communication system typically includes one or more communication interfaces that receive and/or transmit data, and are coupled to other communication systems or devices by one or more communication channels. Communication systems generally communicate using one or more communication protocols as is known in the art. For example, communication systems may communicate using a network protocol such as TCP/IP, and transmit information over a communication channel using a data-link and physical protocols such as SONET, Ethernet, or other protocol. Also, these communication systems may be physically connected to each other by fiber-optic interfaces and may have connections by one or more fiber optic cables.

It should be appreciated that there are many different types of communication interfaces and protocols used for transmitting data.

Data communication is an imperfect process. That is, errors may occur in the transmission of data between a sending entity and receiving entity. Error detection is a process of detecting errors in received data. This may be performed by determining, for a received data signal, whether one or more bits of the received signal have been changed during transmission. Error detection may be performed by one or more methods including those known in the art, such as performing parity checks, using checksums to check received signals, comparing received signals to expected signals, and other methods. Error correction is a process for correcting detected errors in received data so that the received data may be used by the receiving system. For example, a transmitting system may transmit additional information such as code words according to an encoding protocol having a group of predefined codewords. A receiving system inspects received signals, and determines whether the received signals include codewords that are members of the group of predefined codewords.

Communication systems modulate information by mapping information into codewords, also referred to as symbols, that can be efficiently transmitted over a communication channel, such as a cable, air, or other communication medium. The modulated information can experience noise signals from external sources, from the medium, or even from interference with the modulated information itself. These noise signals may change the modulated information so as to be considered incorrect or indiscernible from a receiver of the modulated information. Also, degradation of transmission components such as optical components, or transmission component error, may give rise to errors in received information. The receiver of the modulated information must be able to detect and correct these erroneous signals, and, if necessary, request the transmitter to resend the information.

Communications systems may perform error detection and/or error correction when transmitting and/or receiving data. The use of error correction codes is a common solution for detecting and correcting errors in received information. More particularly, the nature of error correction codes allow a receiver of information to determine the presence of and correct, errors in received information.

Hamming codes are a type of well-known binary error correction block codes used for error detection and correction in communication systems. In a Hamming code, a group of binary code words are defined that are valid. Signals are encoded using the valid code words at a transmitting system, and these code words are transmitted to a destination system where they are decoded. More particularly, the received signals are organized into code word blocks and a determination is made whether a received block belongs to the set of valid codewords. If the received block does not belong, there has occurred an error in one or more locations of the received block. Depending on the group of codewords selected, the destination system may be able to correct one or more bit errors in the received data.

There are many other types of codes used to encode and decode data. BCH and Reed-Solomon codes are well-known types of codes used to detect and correct errors in received information. These and other codes are discussed more fully in various texts, such as the book entitled "Error Control Systems for Digital Communication and Storage" by Stephen B. Wicker, Prentice Hall, Upper Saddle River, N.J. (1995), incorporated herein by reference.

Error detection and correction improves the bit error rate of a particular communication channel by allowing a communication system to detect and correct a finite amount of errors. Forward Error Correction (FEC) is a type of error correction code wherein the algebraic structure of the error correction code is used to determine which of the valid code words is most likely to have been sent, given the erroneous received word. As discussed above, Hamming and other codes provide this capability.

Many types of conventional communication use error detection and correction in their operation. For example, PPP and HDLC communication protocols have a frame structure having a header and trailer, wherein the trailer includes information used for error detection and correction of the frame. Other communication systems employ what is known in the art as a frame check sequence (FCS) or cyclic redundancy check (CRC) codes. For example, Ethernet, Fast Ethernet, and Gigabit Ethernet frames implement a CRC code that is appended to the end of a frame. CRC information used in SDH is a bit interleaved parity CRC polynomial referred to as BIP-8 wherein a parity calculation is calculated for a current frame and transmitted in a subsequent frame over the same physical connection. The BIP-8 error monitoring function is discussed more fully in the book entitled "Broadband Networking: ATM, SDH and SONET" by Mike Sexton and Andy Reid, Artech House, Boston, Mass. (1997).

All of the aforementioned types of communication systems transmit the error correction as part of the transmitted frame or in a subsequent frame, increasing overhead of the frame and decreasing the effective throughput of the communication system. To increase throughput of the communication system, some types of communication systems remove error correction and detection altogether, or rely on higher layers of communication to determine whether data is in error.

SUMMARY

Communication systems exist that have redundant or "backup" data paths that are used in situations where the "primary" or working path is unavailable for transferring data. A backup or redundant data path is a data path that is parallel to the working path between a source and destination of data. A data path may include one or more physical components such as copper, fiber, or other active or passive components. In some network configurations, the redundant path carries a copy of data transmitted on the working path, may not carry data under normal operating conditions, or other configuration wherein the redundant path is not relied on in a normal operating condition for transmitting working data. Data channels may be defined between a source and a destination which use one or more data paths.

A conventional approach for a networking system that provides both a working path and redundant path includes transmitting working data over the working path and potentially the redundant path. Because the redundant path in a conventional system carries no useful information or just a duplicate of the original information, the redundant path provides very little benefit except to be present in case the working path becomes unavailable. In this case, the system switches to the redundant path to transfer working data.

One type of network that provides redundant data paths is the Synchronous Optical Network (SONET) standard defined by the American National Standards Institute (ANSI) for communicating data over optical fiber. An equivalent transmission standard approved by the International Telecommunications Union-Telecom (ITU-T, formerly CCITT) is called Synchronous Digital Hierarchy (SDH). SONET has been used extensively in North America, and SDH has been used world-wide outside of North America. SONET/SDH communication systems, called terminals, may be arranged in a linear or ring architecture wherein terminals are coupled by one or more optical fibers. When more than one fiber is used, one fiber may be designated as a working fiber used to transmit information under normal operating conditions. Another fiber may be designated as a backup, redundant, or protection fiber that does not, under normal operating conditions, carry information. In the event that the working fiber fails, the SONET/SDH terminals recognize the failure and switch all of the information to the protection fiber. Once the working fiber is restored, transmission of information may be switched back to the working fiber.

According to one aspect of the invention, a system and method are provided that uses a first data channel to pass working data and a second data channel to pass error correction information. For example, this second data channel may be defined along a redundant data path. For example, this error correction information may be forwarded error correction (FEC) information such as Hamming code information or any other type of error correction information. Use of the redundant path to forward FEC information provides several advantages: 1) the FEC information can be used to correct bit errors that occur within the system, making the system high-quality and more reliable and 2) provides an efficient method to constantly monitor the quality of both the working and redundant path. Monitoring may be accomplished, for example, by transmitting the FEC information on the redundant path in conjunction with the information on the working path to accurately count the number of errors that occur on the working and redundant paths. Information provided by monitoring the number of errors can then be used to diagnose problems on the working path, so that problems can be fixed before there is a need for the communication system to switch over to the redundant path.

In the conventional system wherein the redundant path simply transmits a redundant copy of the information on the redundant path, a determination may be made by a receiving system that the data on the two paths is different and that one or both paths have a problem. However, the conventional system cannot correct a low bit error rate problem because the system cannot identify on which path the problem exists. Thus, the conventional system cannot correct received information. Also, the conventional system cannot quantify how bad the errors are within the received transmitted data. By passing FEC information on the redundant path through the system, bit errors may be detected and corrected, and a quantification of the problem may be made.

In other conventional systems, original data and FEC information are transmitted over the same path at a much higher data rate, such that both the original data and the new FEC information can be transmitted together. However, a receiver of this data must be able to distinguish between data and FEC information, and must be able to operate at higher transmission frequencies. Transmission at higher frequencies makes hardware more difficult to design and thus cost of the hardware is increased.

Also, the receiver must be able to recognize an alternate frame format including this FEC information. Because transmission standards and data formats are fixed for the primary data transmission channel, there are limited modifications that a system designer could make in the primary data transmission channel without affecting transmission of information to other types of equipment—generally a designer must alter the data transmission format to encode additional information. To overcome these and other problems, the redundant path may be used to forward FEC information, and this information may be transmitted in a format that can be recognized by the receiving system. In one embodiment of the invention, the frame format of FEC information is transmitted in a format being similar in form to a conventional SONET frame. In another embodiment of the invention, FEC information is determined at a byte level or less. By using byte-oriented FEC coding schemes, the method may be used for both grooming and non-grooming applications.

According to one embodiment of the invention, a networking system is provided that makes use of a working and redundant protected data path. The networking system uses the protected path to pass FEC information through the system. By making use of the extra bandwidth of the protected path, any type of forward error correction FEC may be used to improve the quality of a data transmission system. An additional benefit of sending FEC information over the working path is that the FEC information provides a way to actively monitoring the health/quality of the working and protected paths within the system.

In accordance with one embodiment of the invention, a network communication system for transmitting data between systems. The network communication system comprises a working data path over which working data is transmitted by the network communication system, and a redundant data path, wherein the network communication is configured to transmit error correction information over the redundant path, the error correction information being used to correct a portion of the working data. According to another embodiment of the invention, the network communication system is adapted to generate the error correction information. According to another embodiment of the invention, the communication system is adapted to transmit the working data, and wherein the error correction information is derived from the working data by the communication system.

According to another embodiment of the invention, the working data and error correction information are transmitted substantially in parallel over the working data path and redundant data path, respectively. According to another embodiment of the invention, the transmitted error correction information is transmitted substantially in parallel with the working data from which the transmitted error correction information is derived. According to another embodiment of the invention, the network communication system is configured to transmit error detection information indicative of a transmission error occurring on at least one of the redundant and working data paths.

According to another embodiment of the invention, the error correction information is information generated by Hamming encoding operation. According to another embodiment of the invention, the working data is encoded in at least one data frame transmitted on the working data path. According to another embodiment of the invention, the error correction information is encoded in a data frame transmitted on the redundant data path. According to another embodiment of the invention, the data frame is a data frame having at least one format portion of a SONET data frame. According to another embodiment of the invention, the data frame has a SONET data frame format. According to another embodiment of the invention, the redundant data path is a SONET protection path.

According to another embodiment of the invention, the working data is encoded in a first data frame transmitted on the working data path, the error correction information is encoded in a second data frame transmitted on the redundant data path, and the communication system aligns the first and second data frames. According to another embodiment of the invention, a buffer is provided that aligns the first and second data frames based upon information indicating the beginning of at least one of the first and second data frames. According to another embodiment of the invention, the error correction information is forward error correction information. According to another embodiment of the invention, the forward error correction information is received by another communication system and is used to correct bit errors with data frames of the working path.

According to another embodiment of the invention, the communication system provides a signal indicating an error on the working data path. According to another embodiment of the invention, the communication system provides a signal indicating an error on the redundant data path.

According to another embodiment of the invention, error correction information is determined for working data in data block sizes in a range of a byte level or less. According to another embodiment of the invention, the error correction information is used to derive a missing portion of the working data.

According to another aspect of the invention, a method is provided for encoding data comprising determining, for a portion of a working data stream, error correction information derived from the portion, transmitting the portion of the working data stream on a first data channel, and transmitting, the error correction on a second data channel. According to another embodiment of the invention, the first data channel is configured along a working data path, and wherein the second data channel is configured along a redundant data path. According to another embodiment of the invention, the determining operation comprises determining error correction information based upon the portion wherein the size of the portion is in a range of a byte or less. According to another embodiment of the invention, the operations of transmitting the portion of the working data stream and transmitting error correction information are performed substantially concurrently. According to another embodiment of the invention, the method comprises determining error detection information based upon the portion and the error correction information. According to another embodiment of the invention, the method comprises transmitting the error detection information on the redundant path. According to another embodiment of the invention, the determining operation includes determining Hamming code information determined from the portion.

According to another aspect of the invention, a method is provided for decoding data comprising receiving, on a first data channel, a portion of a working data stream, receiving, on a second data channel, error correction information derived from the portion, and determining whether to correct data within the portion based upon the received error correction information. According to another embodiment of the invention, the first data channel is configured along a working data path, and wherein the second data channel is configured along a redundant data path. According to another embodiment of the invention, the method comprises performing an error correction of the portion. According to another embodiment of the invention, the step of performing an error correction of the portion is performed on a byte or less of data. According to another embodiment of the invention, the step of receiving the portion and receiving error correction information are performed substantially in parallel. According to another embodiment of the invention, the method comprises receiving error detection information based upon the portion and the error correction information; and accepting the received portion and error correction information based upon the error detection information.

According to another aspect of the invention, a system is provided for encoding data. The system comprises an error correction generator that generates, for a portion of a working data stream, error correction information derived from the portion, and an interface that is configured to transmit the portion of the working data stream on a first data channel, and configured to transmit the error correction on a second data channel. According to another embodiment of the invention, the first data channel is configured along a working data path, and wherein the second data channel is configured along a redundant data path. According to another embodiment of the invention, the error correction generator generates error correction information based upon the portion wherein the size of the portion is in a range of a byte or less. According to another embodiment of the invention, the interface is configured to transmit the portion of the working data stream and error correction information substantially concurrently. According to another embodiment of the invention, the system further comprises an error detection generator that generates error detection information based upon the portion and the error correction information. According to another embodiment of the invention, the interface transmits the error detection information on the redundant path. According to another embodiment of the invention, the error correction generator determines Hamming code information determined from the portion.

According to another aspect of the invention, a system is provided for decoding data. The system comprises an interface that receives, on a first data channel, a portion of a working data stream and receives, on a second data channel, error correction information derived from the portion, and a decoder that determines whether to correct data within the portion based upon the received error correction information. According to another embodiment of the invention, the first data channel is configured along a working data path, and wherein the second data channel is configured along a redundant data path. According to another embodiment of the invention, the decoder is configured to perform an error correction of the portion. According to another embodiment of the invention, the error correction of the portion is performed by the decoder on a byte or less of data. According to another embodiment of the invention, the interface receives the portion and error correction information substantially concurrently. According to another embodiment of the invention, the interface is configured to receive error detection information based upon the portion and the error correction information, and wherein the decoder is configured to detect errors in the received portion and error correction information based upon the error detection information.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE INVENTION

The invention is pointed out with particularity in the appended claims. The above and further advantages of this invention may be better understood by referring to the following description when taken in conjunction with the accompanying drawings in which similar reference numbers indicate the same or similar elements.

DETAILED DESCRIPTION

Figure 1:
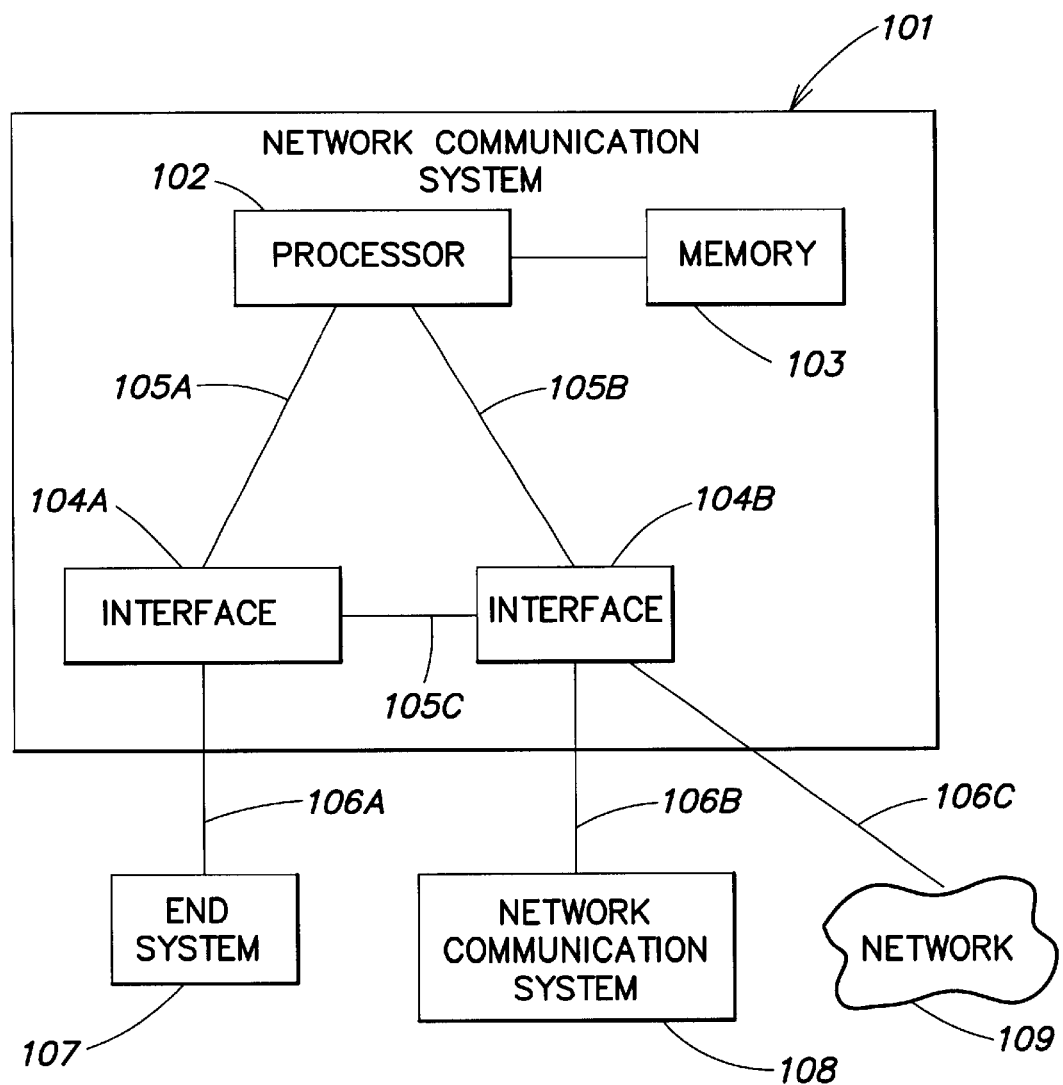
FIG. 1 shows a network communication system suitable for implementing various embodiments of the invention.

FIG. 1 shows a network communication system suitable for implementing various embodiments of the invention. More particularly, encoding and/or decoding methods may be implemented in one or more components of a network communication system 101. A typical network communication system 101 includes a processor 102 coupled to one or more interfaces 104A, 104B. Components of network communication system 101 may be coupled by a communication links 105A–105C which may be, for example, a bus, switch device, or other type of communication link used to transmit and receive data among components of system 101. Processor 102 may have an associated memory 103 for storing programs and data during operation of the network communication system 101. Processor 102 executes an operating system, and as known in the art, processor 102 executes programs written in one or more computer programming languages.

In such a network communication system 101, processor 102 may be a commercially-available networking processor such as an Intel i960 processor, Motorola 68XXX processor, Motorola PowerPC processor, or any other processor suitable for network communication applications. The processor also may be a commercially-available general-purpose processor such as an Intel Pentium-type processor, AMD Athlon, AMD Duron, Sun UltraSPARC, Hewlett-Packard PA-RISC processors, or any other type of processor. Many other processors are available from a variety of manufacturers. Such a processor usually executes an operating system, of which many are available, and the invention is not limited to any particular implementation. An operating system that may be used may include the VxWorks or Unix operating system available from a variety of vendors. The VxWorks operating system is available from the WindRiver Software Corporation, Alameda, Calif.

Various embodiments of the invention may be implemented in software or specially-programmed, special-purpose hardware. For example, according to one embodiment of the invention, encoding and decoding operations may be performed by an ASIC or other type of hardware and/or firmware.

Various embodiments of the present invention may be programmed using an object-oriented programming language, such as SmallTalk, Java or C++, as is known in the art. Other programming languages are available. Alternatively, functional programming may be used. It should also be appreciated that the invention is not limited to any particular computer system platform, processor, operating system, or network. It should also be apparent to those skilled in the art that the present invention is not limited to a specific programming language or computer system and that other appropriate programming languages and other appropriate computer systems could also be used.

System 101 may also include one or more network interfaces 104A–104B which receive and transmit data. Interfaces 104A, 104B may also include their own processors and memory for code and data storage. Interfaces 104A, 104B may have one or more connections to other interfaces or processors within system 101 or memory 103. Interfaces 104A, 104B typically provide functions for receiving and transmitting data over one or more communication links 106A–106C. For example, links 106A–106C may be any communication medium that can be used to transmit or receive data. For example, links 106A–106C may be copper, fiber, or other communication medium. Network communication system 101 communicates over communication channels 106A–106C to one or more end systems 107, other network communication systems 108, or any other type of communication network 109.

End system 107 may be, for example, a general-purpose computer system as known in the art. A general-purpose computer system (not shown) may include a processor connected to one or more storage devices, such as a disk drive. Devices of a general-purpose computer may be coupled by a communication device such as a bus. A general-purpose computer system also generally includes one or more output devices, such as a monitor or graphic display, or printing device. Further, the general purpose computer system typically includes a memory for storing programs and data during operation of the computer system. In addition, the computer system may contain one or more communication devices that connect end system 107 to a communication network and allow system 107 to communicate information. This communication device may be, for example, a network interface controller that communicates using a network communication protocol.

Network 109 may be, for example, a communication medium or a combination of media and active network devices that receive and transmit information to system 101. Network 109 may include, for example, a SONET, ATM, Frame Relay, DSL or other type of wide area network (WAN) protocol types, and/or Ethernet, Gigabit Ethernet, FDDI or other local area network (LAN) protocols. It should be understood that network 109 may include any type and number and combination of networks, and the invention is not limited to any particular network implementation.

Figure 2:
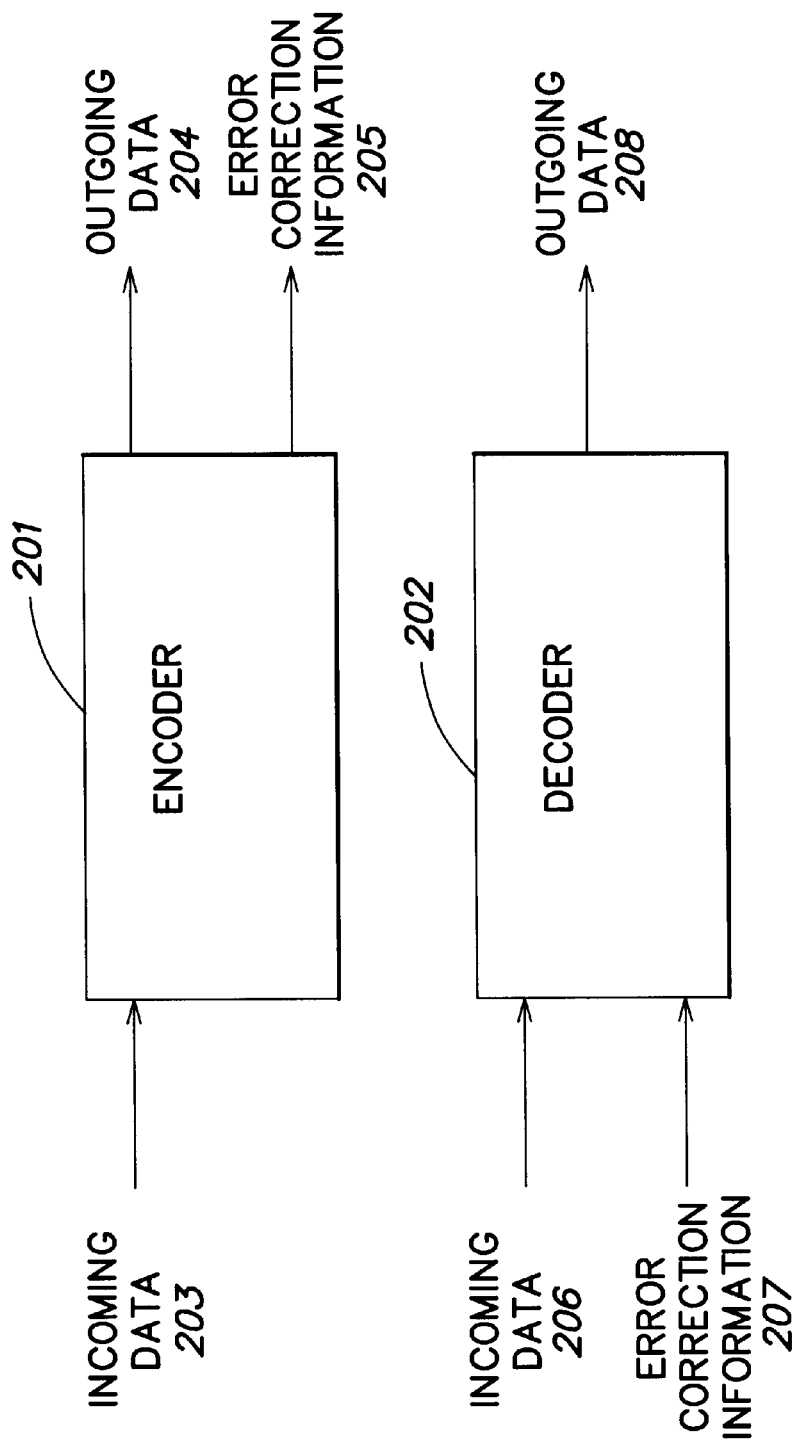
FIG. 2 shows an encoder and decoder in accordance with various embodiments of the invention.

FIG. 2 shows an encoder 201 and a decoder 202 in accordance with various embodiments of the invention which may be implemented in, for example, one or more interfaces 104A, 104B of network communication system 101. Various embodiments of the invention may also be implemented in end system 107 or any portion of communication network 109. Encoder 201 receives an incoming data stream 203 and produces outgoing data stream 204 and a separate error correction information data stream 205. In accordance with one embodiment of the invention, the error correction information 205 is derived from the incoming data 203. Decoder 202 accepts an incoming data stream 206 and error correction information 207 and produces an outgoing data stream 208. More particularly, decoder 202 uses error correction information 207 to determine whether there are errors in the incoming data 206, corrects the incoming data 206, if possible, and produces a corrected data stream as outgoing data stream 208. In one embodiment of the invention, decoder 202 can determine, based on error correction information 207, whether the data path used to transfer the error correction information is experiencing errors.

Figure 3:
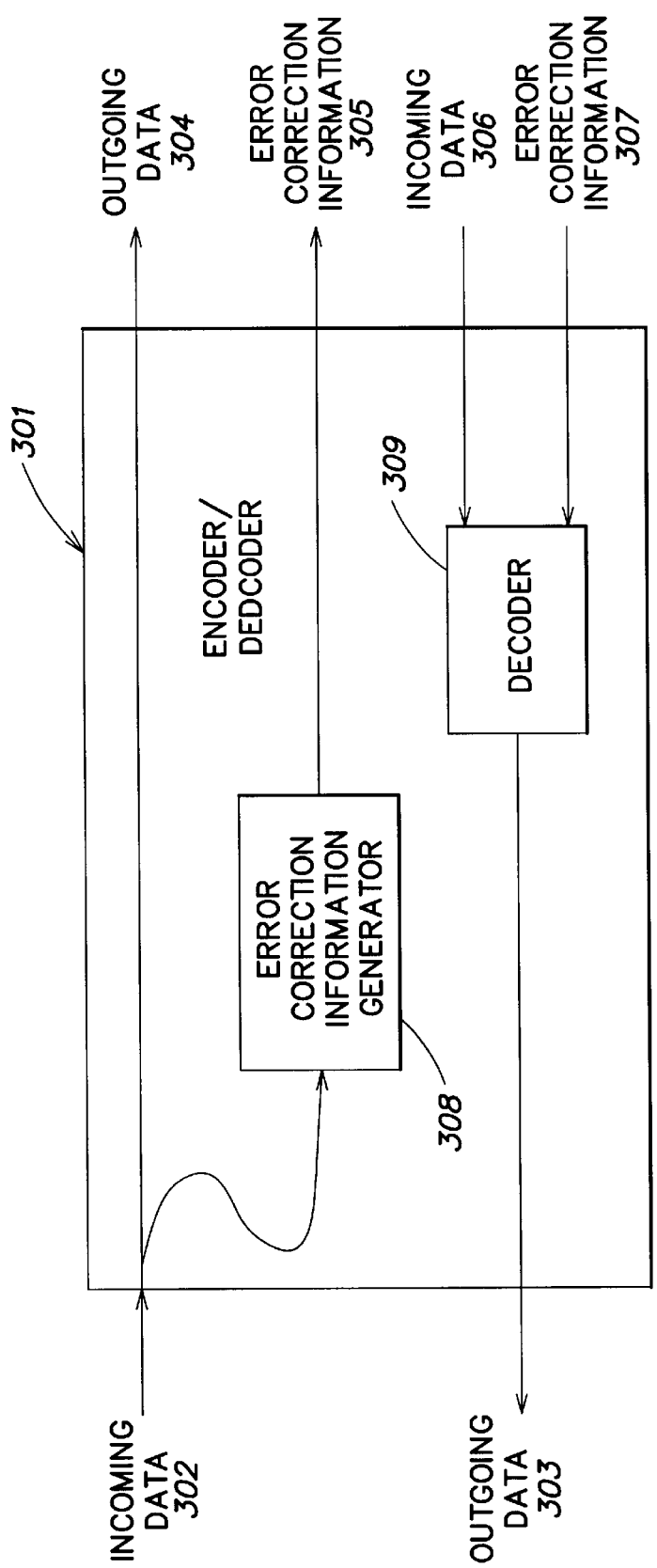
FIG. 3 shows an encoder/decoder system in accordance with another embodiment of the invention.

FIG. 3 shows a network communication system in accordance with one embodiment of the invention. More particularly, an encoder/decoder 301 is provided which encodes and decodes received data. Encoder/decoder 301 may be included, for example, within an interface 104A, 104B of network communication system 101. Encoder/ decoder 301 receives incoming data 302 and produces outgoing data 304 and error correction information 305. Incoming data 302 is provided to an error correction information generator 308 which generates error correction information 305. Outgoing data 304 and error correction information 305 may be then used by another system to receive and correct data. Encoder/decoder 301 also receives an incoming data stream 306 and an error correction information stream 307. Streams 306, 307 are provided to a decoder 309 which then produces an outgoing data stream 303. Decoder 309 may be similar in function to decoder 202 discussed above with reference to FIG. 2. Error correction information generator 308 may be similar to a portion of encoder 201 which receives incoming data and generates error correction information 205 based on such incoming data.

According to one embodiment of the invention, encoder/ decoder 301 may be used in association with a SONET/SDH communication system wherein terminals are coupled by one or more optical fibers. A SONET/SDH communication system, as discussed above, allows coupling of terminals by a working and a protection optical fiber.

Figure 4A:
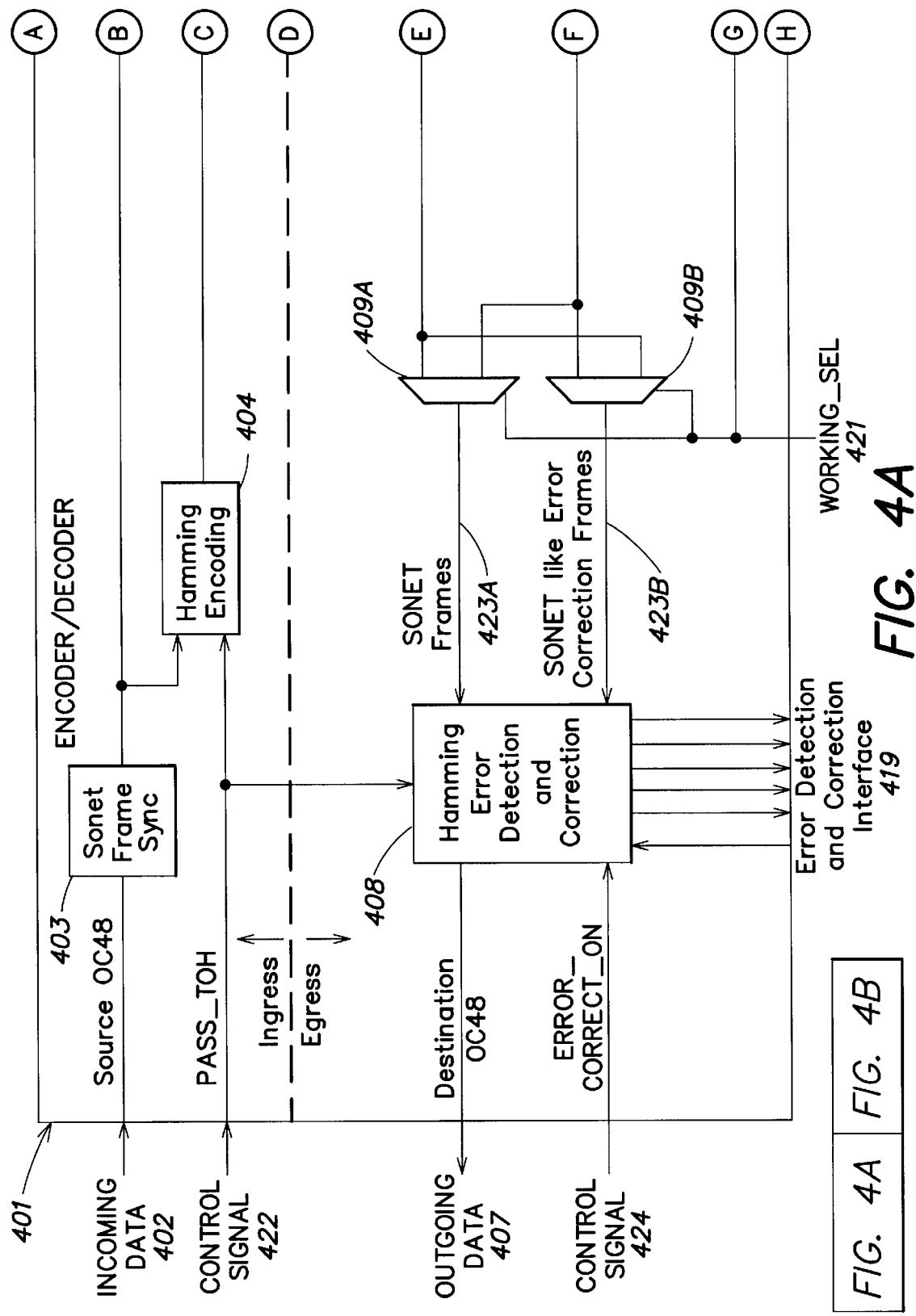
FIG. 4 shows an encoder/decoder system in accordance with another embodiment of the invention.
Figure 4B:
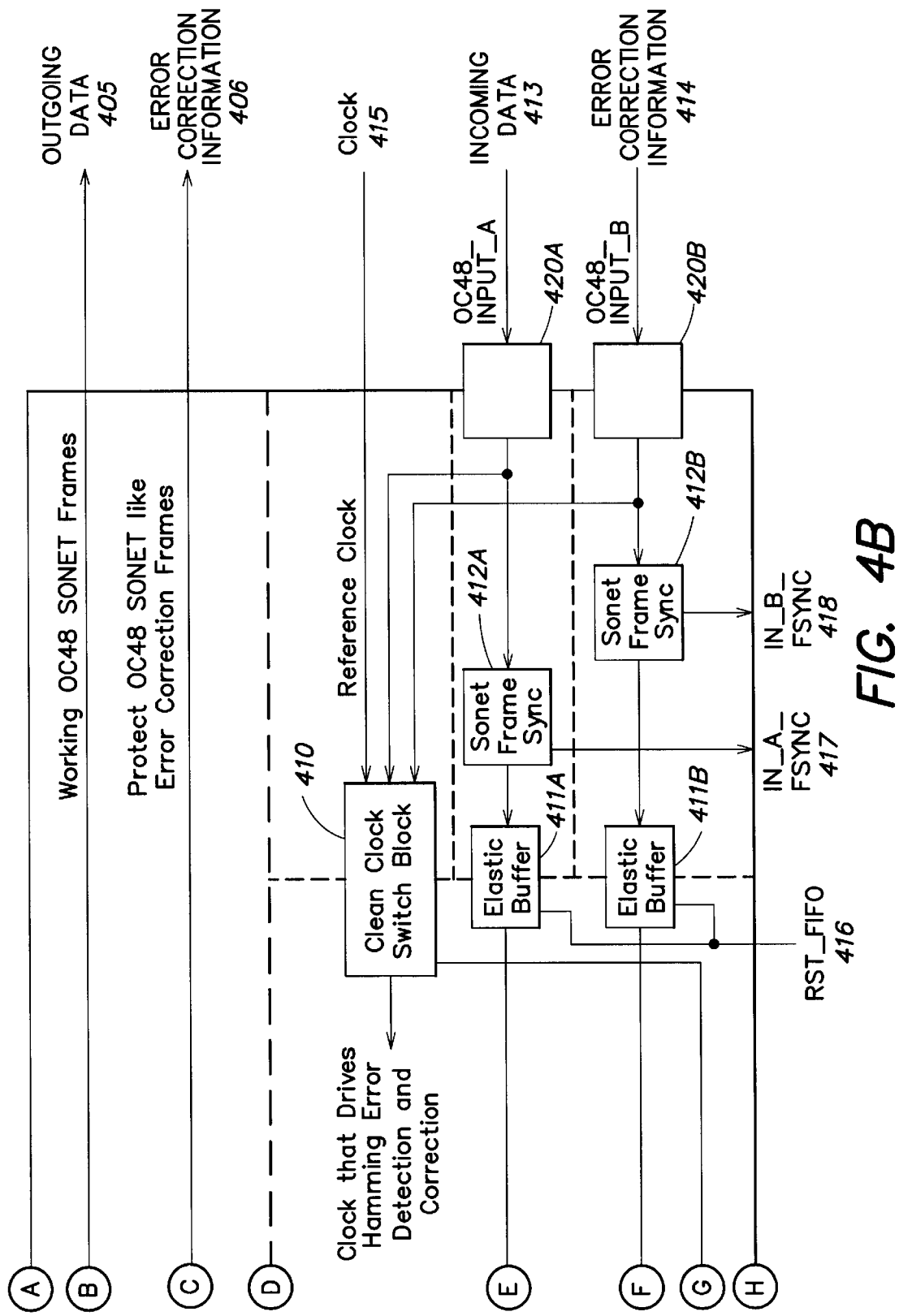

A more detailed encoder/decoder 401 may be used in a SONET/SDH communication device is shown in FIG. 4. Encoder/decoder 401 receives incoming data 402 which may be, for example, a source OC-48 SONET signal comprising one or more SONET frames. It should be appreciated that any SONET/SDH transmissions may be used, and the invention is not limited to OC-48 SONET signals.

Figure 6:
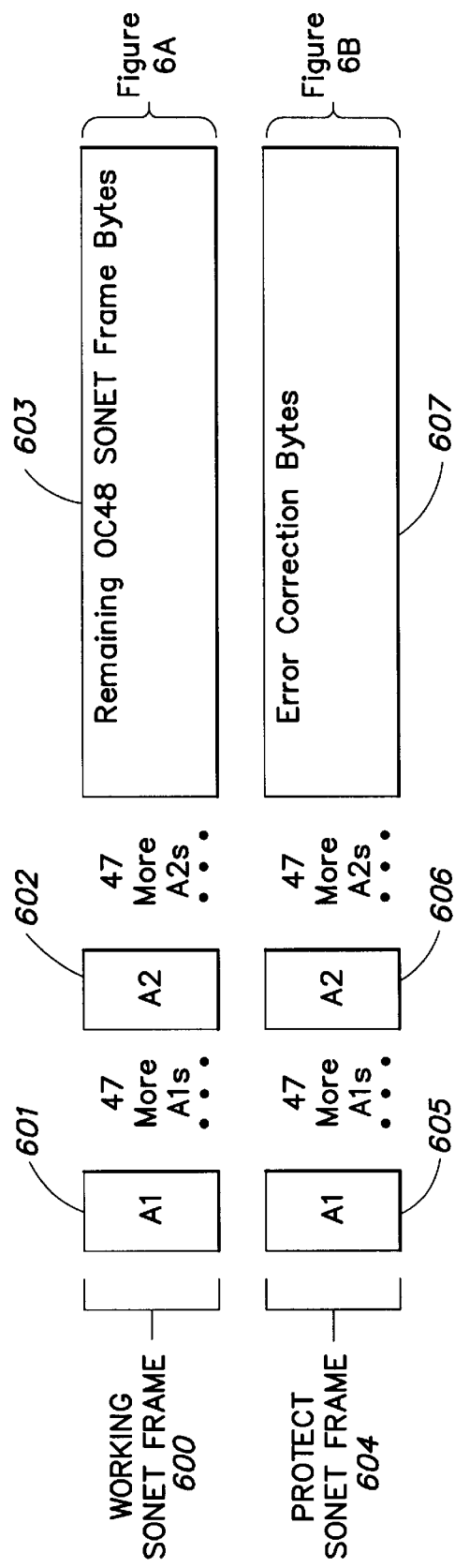
FIG. 6 shows data frame formats in accordance with one embodiment of the invention.

Encoder/decoder 401 produces outgoing data 405 which is identical in format to incoming data 402. Also, encoder/ decoder 401 produces error correction information 406 determined from incoming data 402. According to one embodiment of the invention, error correction information 406 is formatted in a frame similar to a SONET frame. SONET frames and frame formats are discussed below in more detail with respect to FIG. 6.

Encoder/decoder 401 also receives incoming data 413 which may be, for example, an OC-48 SONET input signal and may also receive error correction information 414, which may be, for example, formatted in a data frame similar in format to a SONET frame. Encoder/decoder 401 may produce outgoing data 407 which is derived from incoming data 413 and error correction information 414. The outgoing data 407 may also be an OC-48 SONET signal comprising one or more SONET frames.

More particularly, encoder/decoder 401 receives incoming data 402 where it recognizes and synchronizes its encoding operation by SONET frame sync 403. More particularly, SONET frame sync 403 recognizes the beginning of a SONET frame by looking for a special pattern that indicates the beginning of the SONET frame. Encoder/ decoder 401 also includes a Hamming encoder 404 which takes the synchronized OC-48 signal produced by SONET frame sync 403 and produces error correction information 406 which may be, for example, an OC-48 SONET frame which includes error correction information.

Encoder/decoder 401 may also receive a control signal 422 which, when active, causes Transport Overhead (TOH) overhead bytes of the original SONET frame to be placed in SONET error correction frames output as error correction information 406. When the signal is not active, encoder/ decoder 401 generates an error correction byte for each TOH overhead byte, in a similar manner to generating error correction bytes for payload bytes in the SONET frame as discussed below with reference to FIG. 6. A byte is defined as a block of eight (8) bits. Further, when this byte is active, encoder/decoder may also be prohibited from performing error correction or error detection on TOH overhead bytes on the egress side of encoder/decoder 401.

On the egress side of encoder/decoder 401, incoming data 413 is input to a clock recovery unit 420A which accepts data and generates a clock to accompany the data. Similarly, clock recovery unit 420B may recover a clock from error correction information 414 in a similar manner. Encoder/decoder 401 may or may not include recovery units 420A, 420B internally or externally to encoder/decoder 401. Both the incoming data 413 and error correction information 414 are passed to SONET frame syncs 412A, 412B, respectively, each of which recognizes a beginning of a received SONET frame as discussed above with reference to item 403. SONET frame syncs 412A, 412B may provide status signals IN_A_FSYNC 417 and IN_B_FSYNC 418 to an external system. Signals 417, 418 are status signals indicating frame synchronization status of incoming data 413 and error correction information 414.

Encoder/decoder 401 may also include elastic buffers 411A, 411B which buffer the incoming data 413, or error correction information 414, in order to synchronize SONET frames of streams 413, 414. Elastic buffers 411A, 411B may also include an input that accepts an input signal RST_FIFO 416 which can be used to reset elastic buffers 411A, 411B if they are in an unrecoverable state. More particularly, because the working and protected paths may have slightly different delays (received concurrently with a slight delay on either path), elastic buffers are provided on both of the inputs 413, 414 so that SONET frames of each of the inputs 413, 414 may be aligned to each other such that a forward error correction (FEC) operation may be performed. If either of buffers 411A, 411B are filled for example, when signals 413, 414 become unsynchronized beyond an acceptable tolerance, buffers 411A, 411B may be reset. According to one embodiment of the invention, encoder/decoder 401 aligns two SONET frames up to ±16 bits apart, but the number may be any number. The number 16 is derived from an estimate of the depth of the elastic buffers needed to make the chip operate with other components used in the implementation. It should be understood that other number of bits of alignment tolerance may be used.

A clean clock switch block 410 is provided on the egress side of encoder/decoder 401 to generate a clean clock signal that drives error detection and correction functions such as those performed by Hamming error detection and correction module 408. Block 410 accepts a reference clock 415 from the transmitter of incoming data 413, 414 along with clock derived from elements 420A, 420B which are derived from inputs 413, 414. Block 410 merely reconciles clock discrepancies between its inputs such that an accurate error detection and correction operation may be performed on the incoming data.

Outputs of elastic buffers 411A, 411B are provided to multiplexers 409A, 409B. Multiplexers 409A, 409B accept a WORKING_SEL signal 421 which allows a selection of one of the two inputs 413, 414 that contain the original SONET frames containing incoming data. By default, signal 421 may select the other input as receiving error correction information 414. When this signal changes value, encoder/decoder 401 is able to switch the received working and protect input signals after elastic buffers 411A, 411B such that no errors occur. This feature allows an error-free working path to protect path switchover described in more detail below.

Outputs 423A, 423B including aligned SONET frames are provided to Hamming error protection and correction 408 which performs error detection on the incoming data 413 based on error correction information 414. As a result of this detection and correction, an outgoing data stream 407 is produced which may be, for example, an output stream of OC-48 SONET frames. Block 408 also may include one or more input and/or output signals that allow another system to monitor and/or control the error detection and correction process. For example, encoder/decoder 401 may include an error detection and correction interface 419 which includes one or more inputs and one or more outputs to encoder/decoder 401 for transmitting error detection and correction state information. Block 408 may also include a control signal 424 ERROR_CORRECT_ON which, when active, controls block 408 to correct detected bit errors on the received SONET frames. If control signal 424 is not active, block 408 may transmit SONET frames untouched, but may also monitor to determine which bit errors it could have fixed in a received SONET frame.

According to one embodiment of the invention, the generation of error correction bytes is never turned off on the ingress side of encoder/decoder 401. In encoder/decoder 401 there may be a method to disable error correction operations. In some implementations, generation of the error correction may be turned off on the ingress side of the encoder/decoder 401, but it is realized that this may create race conditions with simultaneously synchronizing turning off the usage of the error correction information on the egress side of the encoder/decoder 401. An easier method to avoid such race conditions is just to leave the error correction generation on the ingress side and to selectively use error correction on the egress side.

Figure 5:
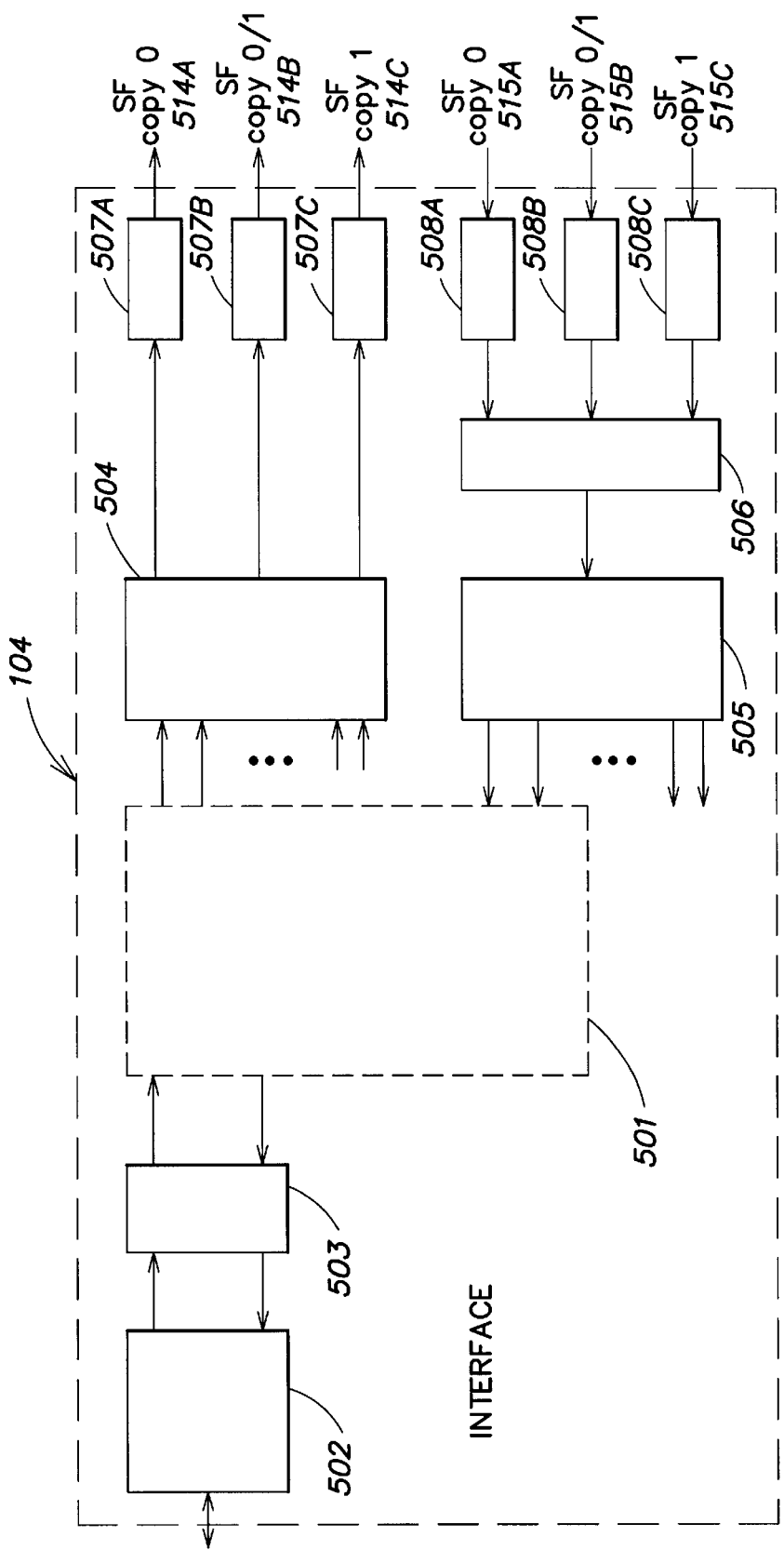
FIG. 5 shows a system incorporating an encoder/decoder in accordance with one embodiment of the invention.

FIG. 5 shows a system incorporating an encoder/decoder in accordance with one embodiment of the invention. As discussed above with reference to FIGS. 1 and 2, an encoder and/or decoder may be implemented in an interface 104A, 104B (generally, interface 104) of a network communication system 101. Interface 104 may be, for example, a port interface card (PIC) of a communication system such as an optical switch.

More particularly, interface 104 may include a line termination module 502 which, for example, may receive a signal from a network or other system through a communication channel and may be configured to transmit information on the transmission channel. Module 502 receives and provides information to a serial/deseriallizer module 503 which performs serializing and deserializing of data. Module 503 provides and accepts data to an encoder/decoder 501 which may be similar in function to encoder/decoders 301, 401, as discussed above.

Encoder/decoder 501 provides output data and error correction information to a crosspoint switch module 504 which then routes data through different working and protection paths in the communication system. Outputs of switch module 504 may be provided to optical drivers 507A–507C which in turn transmit data over one or more fibers 514A–514C. Optical drivers 507A–507C may be, for example, transmitters implementing vertical cavity surface emitting laser (VCSEL) technology that transmit information in a SONET-compliant optical system. Similarly, an interface 104 may accept one or more fiber optic inputs 515A–515C whose data is provided to receivers 508A–508C. Receivers 508A–508C for example, may be pin diode receivers as is known in the art of optical communications. Optical receivers 508A–508C may in turn provide outputs to a retimer 506 which improves signal quality of the incoming signals. Retimer 506 provides an output to a crosspoint switch 505 which routes data to encoder/decoder 501.

As discussed above, encoder/decoder may receive and generate error correction information. According to one embodiment of the invention, the encoder/decoder uses a (7, 4) Hamming encoding scheme to protect data in SONET frames at a byte-level. In particular, for each byte of an incoming (or ingress) SONET frame, one byte of Hamming-encoded error correction information is generated and placed in a corresponding byte location of an error correction SONET-like frame. Although error correction information may be performed at a byte-level, error correction information may be generated at any level.

As discussed above, a SONET frame is a standard data format used in the networking industry to pass data from one system to another. To allow use of existing SONET chips that receive and transmit SONET frames, according to one embodiment of the invention, error correction data that is sent over the working path shares some portion of the formatted fields that are contained in a standard SONET frame. Therefore, data that is sent over the protected path shares a few standard fields that are typically within a SONET frame, but other portions of the frame are used in a different way to pass FEC information. Therefore, these modified SONET frames are referred to hereinafter as being "SONET-like".

Because error correction information is generated and placed in a corresponding byte location of an error correction SONET-like frame, this error correction scheme may be applied to grooming and non-grooming applications because SONET frames are groomed at a byte-level. More particularly, large SONET frames (e.g., STS-48 SONET frames) are the composition of up to 48 smaller STS-1 SONET frames. Grooming is a process of taking two or more STS-N SONET frames and swap pieces (STS-1 pieces) of one STS-N SONET frame with the pieces (STS-1) pieces that are in a different SONET frame. When grooming is performed, it is performed at the byte level. Because according to various embodiments of the invention, an FEC scheme is used that protects data at a byte level, this coding scheme works for both grooming and non-grooming applications. It should also be appreciated that error correction information may be generated on data smaller than a byte and yet support grooming applications. It should also be understood that other encoding schemes may be used, particularly if grooming is not implemented. For example, other Hamming codes, linear block codes, convolution codes or other codes may be used to generate error correction information as discussed above.

FIG. 6A shows a working SONET frame 600 which may be a frame format of a data frame received and transmitted as incoming and outgoing data. More particularly, a working SONET frame 600 includes overhead bytes A1 (item 601) and A2 (item 602) bytes and remaining OC-48 frame bytes 603. Similarly, a protect SONET frame 604 having formatting similarities to SONET working frame 600, may also include overhead bytes A1 (item 605) and A2 (item 606). Further, protect SONET frame 604 may include matching error correction bytes 607 corresponding to each byte in the SONET working frame 600. It should also be appreciated that other data formats may be used. For example, error correction bytes 607 may be, for example, determined based on information from both the working frame 600 and protect frame 604. Also, error correction information may be generated based on information larger or smaller than a byte of data.

Figure 7:
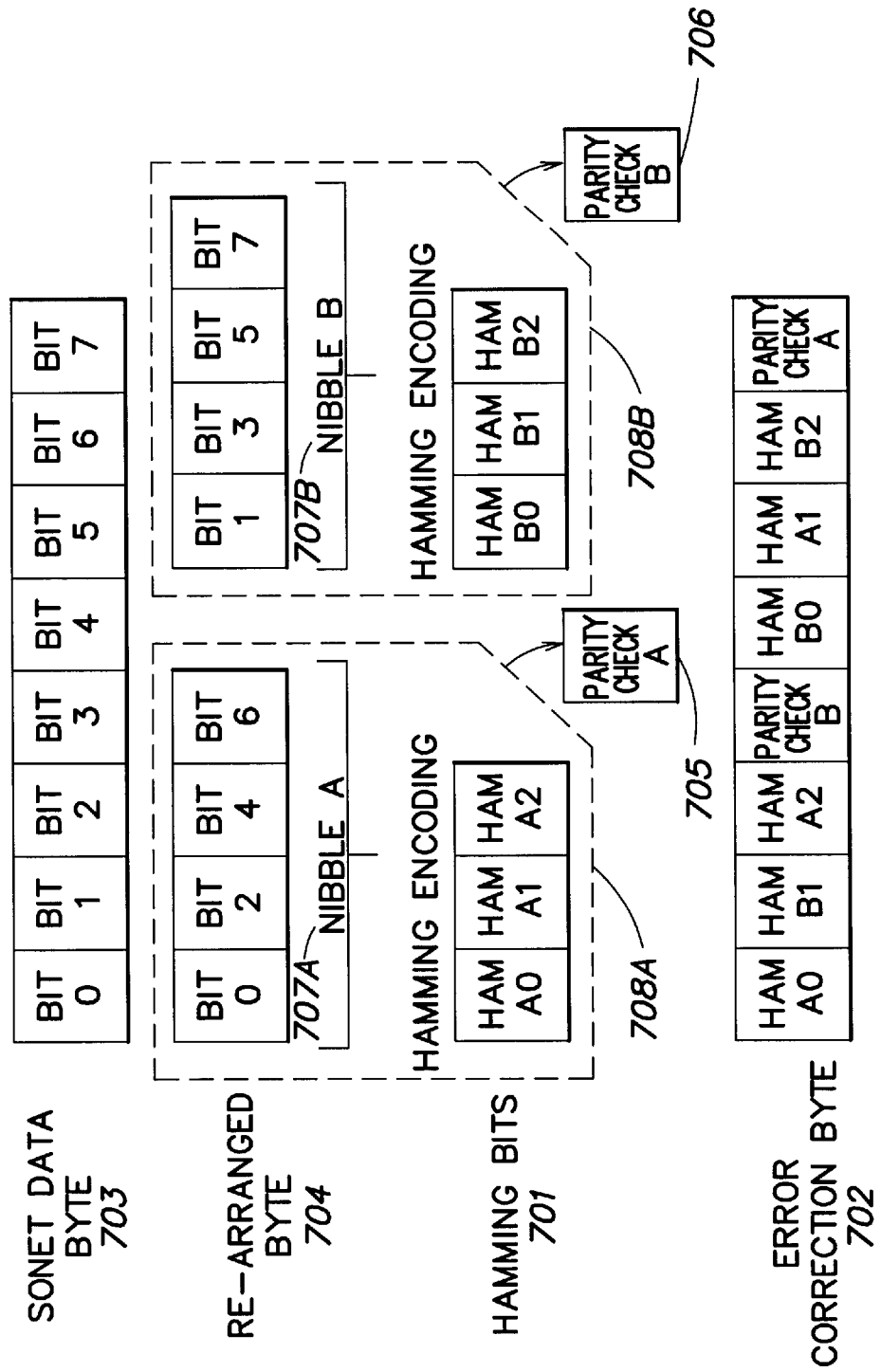
FIG. 7 shows more detailed data frame formats in accordance with one embodiment of the invention.

FIG. 7 shows an encoding format according to one embodiment of the invention. In particular, FIG. 7 shows how three Hamming bits 701 are generated and stored in an error correction byte 702 for two nibbles 707A, 707B of information in the SONET data byte 703. Note the adjacent bits in the SONET data byte 703 are first rearranged to produce a rearranged byte 704 such that no two adjacent bits are encoded into the same Hamming nibble 707A, 707B. This rearrangement guarantees that the decoder can detect and fix all single and two-bit adjacent bit errors. Each of the four-bits shown are then Hamming encoded, generating three bits 701 of Hamming information for each nibble 707A, 707B. These Hamming bits 701 are then placed into the error correction byte 702 such that no two adjacent Hamming bits are located next to each other. This arrangement allows a decoder to detect and fix all single and two-bit adjacent errors in a SONET traffic stream. In addition, error detection information such as parity bits 705, 706 may be generated over each nibble 707A, 707B, respectively, of the SONET frame and Hamming bits produced for that nibble. The two parity bits 705, 706 extend the (7,4) Hamming code such that it can also detect many multi-bit errors that a decoder cannot fix. These parity bits 705, 706 provide extra information that indicate the health of both the working and protection paths. More particularly, because error detection information may be generated based on working and error correction data, errors may be detected in both the working and error correction data. Also, because working data may be derived from the error correction data, the error correction data may be used to reconstruct the working data when, for example, the working data is lost, the working data path becomes inoperative, or the working data is otherwise unavailable. Thus, the protection path may be used for both transferring data and for transmitting error correction information.

As discussed above, a Hamming code is a well-known family of forward error-correcting codes with single bit error-correction capability. Hamming code HC(n,k) takes a block of k data bits and appends n−k parity check bits to form an n-bit block. Code structure allows (n, k) values with $n=2^m-1$ and $k=2^m-m-1$, for $m=2,3,\ldots$ The relative amount of added redundancy decreases with increasing m, as a consequence the coding performance also deteriorates with larger values of m. There are $2^k$ code words in the code each with k=n−m bits of data and m bits of parity. The minimum Hamming distance (d_min) between any pair of Hamming code words is 3, resulting in the ability to correct any single bit error that occurs within the n-bit code word.

The smallest nontrivial code occurs with m=3, resulting in the (7,4) Hamming code. This code produces an encoding operation that does not involve multiple bytes in a received data stream. That is, a coding operation that generates error correction information that can be used to detect and correct errors in transmitted data blocks having a size of a byte or less. This feature is beneficial, as this code will operate for both grooming and non-grooming applications. The code also produces redundancy bits that fit into the protection bandwidth of the protection channel, i.e. less than 100% additional bandwidth of the protection channel is needed. It should be appreciated, however, that any code may be used for detecting and correcting errors in transmitted data.

Encoder

According to one embodiment of the invention, encoder 201 is a Hamming encoder HC(7, 4). The output of the Hamming encoder for HC(7,4) is a code word (d1,d2,d3, d4,p1,p2,p3) where d1, . . . , d4 are the data bits and p1,p2,p3 are parity check bits. An encoding operation according to one embodiment of the invention implements the following equations:

$$p1 = d1+d3+d4$$

$$p2 = d1+d2+d3$$

$$p3 = d2+d3+d4 \qquad (1)$$

wherein the "+" operator refers to binary (modulo 2) addition. The encoder can be implemented in minimal hardware (three binary adders, and possibly a 4-bit shift register to shift the data serially in). Other ways of implementing the encoder may be implemented.

Decoder

According to one embodiment of the invention, decoder 202 is a Hamming decoder HC (7,4). Decoder 202 receives a 7-bit block y=(y1,y2, . . . ,y7) which may or may not be corrupted by channel errors. Hamming code words are chosen such that for every received data block y, there is a code word x which differs from y in at most a single bit position. That is, either a legal code word is received by the decoder, or a single bit of y is changed to convert the received data block into a legal code word. Thus, the decoder decides which bit, if any, is changed or "flipped" in the received data block. This determination is done through the syndrome computation, which is well-known in the art and is described in more detail below.

The decoding operation below is optimal, in the sense that it yields the minimum probability of bit error among all decoders, when the channel is memoryless. Of course, it is always possible for the decoder to incorrectly translate received blocks to the wrong valid code word. For example, suppose the code word x=(1,1,0,0,1,0,1) is transmitted and data block y=(1,1,0,1,0,0,1) is received. The optimal decoder will decide that the channel had flipped the last bit of the transmitted code word, and will decode (1,1,0,1,0,0,0), which is incorrect. The decoder acts on the "maximum likelihood" principle: based on what the receiver sees, a single bit error at the 7th bit position is more likely to have happened than the actual double-bit error at 4th and 5th bit positions.

The HC(7,4) decoder first computes a 3-bit syndrome vector s=(s1,s2,s3) from the received block y as:

$$s1 = y1+y3+y4+y5$$

$$s2 = y1+y2+y3+y6$$

$$s3 = y2+y3+y4+y7 \qquad (2)$$

Note that the equations above involve checking whether the parity bits and the data bits satisfy the interrelationship the bits had at the encoder output. Therefore, in the absence of channel errors, s is always (0,0,0) and y is decoded as the (best of estimate of) the transmitted code word. When not all the bits of the syndrome s are 0, the decoder must determine how to modify y, the received data block. This determination includes finding an error estimate e such that y=x'+e for some code word x'. For optimal decoding, e must have the minimum Hamming weight among all possible choices. As mentioned earlier, the Hamming weight of e (defined as the total number of binary 1s in e) does not have to exceed 1 in the case of a Hamming code. Stated in a different way, there is a one-to-one mapping between the 8 possible (3-bit) syndrome vectors and 8 (7-bit) error patterns of Hamming weight 0 or 1.

This mapping is shown in Table 1 below:

TABLE 1

Syndrome table for HC(7,4)

| Syndrome s = (s1s2s3) | Optimal error estimate e |
|---|---|
| 000 | 000000 |
| 001 | 0000001 |
| 010 | 0000010 |
| 100 | 0000100 |
| 101 | 0001000 |
| 110 | 1000000 |
| 111 | 0010000 |

Once the syndrome is computed using the equation (2) above, any method of implementing the syndrome table above serves as a feasible decoding system. One alternative is to use a table lookup. A more efficient implementation at high-speed includes using combinational logic as provided by the following equations:

$$e1 = s1\ s2\ s3'$$

$$e2 = s1'\ s2\ s3$$

$$e3 = s1\ s2\ s3$$

$$e4 = s1\ s2'\ s3$$

$$e5 = s1\ s2'\ s3'$$

$$e6 = s1'\ s2\ s3'$$

$$e7 = s1'\ s2'\ s3 \qquad (3)$$

wherein ' indicates logical complement (0'=1, 1'=0) and binary multiplication is equivalent to a logical AND operation. Thus, the error-pattern computation circuit can be implemented with a total of seven AND gates (each with three inputs) and nine inverters as is apparent to one skilled in the art.

Once the error pattern estimate e is obtained, the decoded code word c=y+e can be computed using 7 XOR gates. Note that the last three bits of c are the parity bits which may not be needed at the decoder output. If that is the case, the last three equations in equation (3) (and in the vector equation c=y+e) need not be executed.

In summary, HC(7,4) encoding/decoding algorithms implemented according to one embodiment of the invention operate as follows:

Encoder
Input: 4-bit data block d=(d1,d2,d3,d4)
Output: 7-bit code word x=(d1,d2,d3,d4,p1,p2,p3)
Operation: p1, p2, p3 calculated using equation (1)

Decoder
Input: 7-bit channel output y=(y1,y2, . . . , y7)
Output: 7-bit code word c=(c1,c2, . . . , c7)
Operation:
 1. Calculate syndrome s using equation (2) above
 2. Use s to calculate error estimate e using equation (3) above
 3. Output decoded code word c=y+e Error Rate Performance As mentioned before, the Hamming code corrects all single-bit errors that corrupt the 7-bit transmitted block. Let the channel bit error rate (BER) be p. Assuming that each transmitted bit is flipped by the channel with probability p, independent of all other bits (i.e. no error bursts), let Pc denote the probability that the decoded code word is different from the transmitted code word (code word error probability). Because a code word is in error if and only if two or more bit errors have occurred within the block, the following relation holds:

$$Pc = 1 - (1-p)^7 - 7p(1-p)^6 \qquad (4)$$

$$\sim = 21p^2$$

The quality of the approximation in the second line is excellent when p<1e–2. The code word error rate Pc is an upper bound on the BER for the FEC system (note that not every data bit is in error when a code word error occurs).

Equation (4) above shows the dramatic benefit of FEC on the BER: a raw BER of 1e–5 is reduced to 2e–9, a raw BER of 1e–10 is reduced to 2e–20. This effect is unexpected, as the HC(7,4) code is considered by those skilled in the art to be a relatively weak FEC. This BER reduction translates to a coding gain of nearly 3 dB, which is considerable given the minimal complexity involved in implementing the code.

Use of the 8th Bit as an Overall Parity Check

In accordance with another embodiment of the invention, an extra bit on the protect channel per 4-bit nibble on the working channel can be used to further enhance the performance of the FEC. This bit can be used as a fourth parity check bit p4 which is an overall parity check on a 7-bit code word 708A, 708B including both working and error correction data. From equation (1), we have:

$$p4=d1+d2+d4.$$

Thus, the encoder needs an extra (3-input) XOR gate to implement the overall parity check. The extended Hamming code has parameters n=8, k=4, and is denoted hereinafter as EHC(8,4). Because each code word in EHC (8,4) has even parity (even number of 1s), the minimum distance of the code is increased from 3 to 4. This enables the code to detect all double-bit errors (in the 8-bit code word) in addition to correcting all single-bit errors.

The decoder for EHC(8,4) receives and 8-bit block (y1, y2, ... ,y8) and computes the same three syndrome bits (s1,s2,s3) described in equation (2). In addition, a fourth syndrome bit is computed according to:

$$s4=y1+y2+y3+y4+y5+y6+y7+y8$$

Note that s4 is an overall parity check of the received block. If s4=1, then an odd number of errors have occurred, and the receiver proceeds as before in calculating the error estimates according to equation (3) above. If s4=0, then either all e_i's (i=1,2, ... ,7) are 0 in which case error-free reception is assumed, or one of the e_i's is 1, in which case at least two of the 8 bits are in error. In the latter case, error correction is likely to be unsuccessful and should not be attempted. Thus, the error correction is gated by the value of s4 and described as:

$$c\_i=y\_i+s4' \text{ } ei \text{ } I=1,2,\ldots,7$$

where c_I is the decoded I'th bit.

Figure 8:
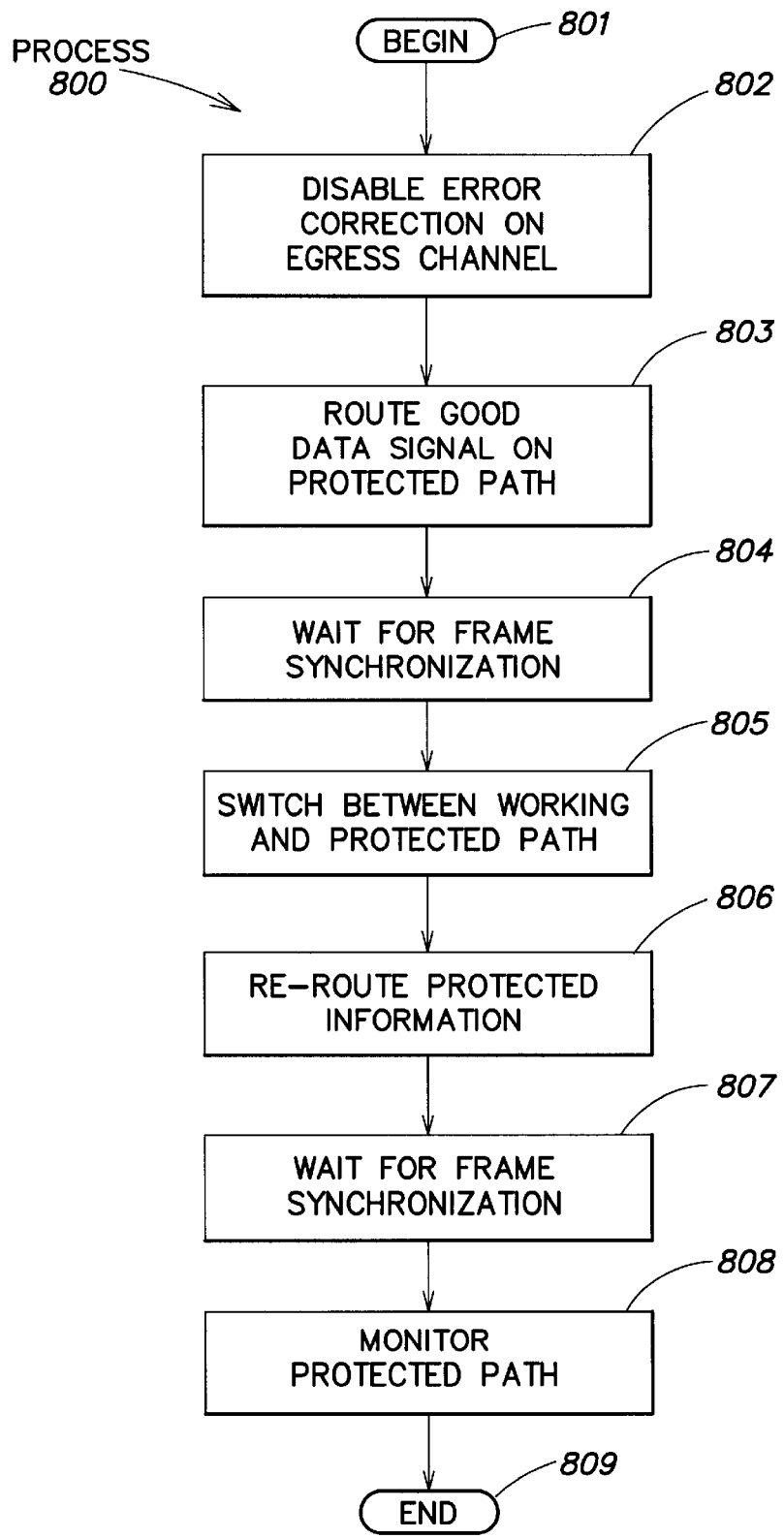
FIG. 8 shows a process for performing data error correction in accordance with one embodiment of the invention.

FIG. 8 shows a process for performing error detection and correction in association with an encoder/decoder 401 as shown in FIG. 4 and the interface 104 as shown in FIG. 5. More particularly, an encoder/decoder according to one embodiment of the invention may be used in performing an error-less switchover between a working and protected path. A process 800 for performing such a switchover is shown in FIG. 8. At block 801, process 800 begins. At block 802, interface 104 of network communication system 101 turns off error correction on the egress side of the encoder/decoder 401. At block 803, interface 104 uses a first stage cross-point switch 505 to route a known-good SONET signal through protected switch fabric of switch 505, so that the working SONET signal is received on both egress inputs of the encoder/decoder 401. At block 804, interface 104 waits to receive an indication that frame synchronization exists on both the working and protected paths of egress inputs to encoder/decoder 401.

At block 805, when frame synchronization is achieved, the encoder/decoder input "WORKING_SEL" signal is used as discussed above with reference to FIG. 4 to switch between the two SONET inputs of encoder/decoder 401. Encoder/decoder 401 switches the working and protected streams after its elastic buffers in a way that is error-free to the flow of SONET frames. At block 806, interface 104 uses the first stage cross-point switch 504 to route protected data coming out of the ingress side of encoder/decoder 401 through the interface 104 so that the protected data may be re-routed to the new protected input of the egress side of encoder/decoder 401. At block 807, interface 104 waits for the encoder/decoder 401 to frame synchronize on the protected path. At block 808, interface 104 monitors the health of the protected path using encoder/decoder 401 output information received through interface 419 that provides information on error correction and detection as discussed in more detail below. At block 809, process 800 ends. It should be appreciated that other methods for performing a switchover may be used, and process 800 is merely an example.

More particularly, interface 419 provides information regarding errors that were detected and fixed and those that were detected and could not be fixed. By utilizing this information, interface 401 is able to detect when the working or protected paths are experiencing excessive error rates on the working or protected paths.

When grooming is turned on, a SONET frame does not flow from one input interface to one output interface. Instead, different sections of the SONET frames flow from one input card to different egress interfaces. Therefore, if there are error rates in the working or protect streams, the errors could be matched to one or two STS-1 links that came from a particular ingress interface having trouble with its ingress link to the switch fabric. For grooming, it may also be useful to keep track of bit errors that were fixed at a STS-1 level so that it may be determined which links in the system are currently experiencing errors.

The following describes an error correction and detection information interface 419 according to one embodiment of the invention. The first sub-section below describes several requirements of this interface and the second sub-section below describes an additional feature of this interface that expands its capabilities.

Figure 9:
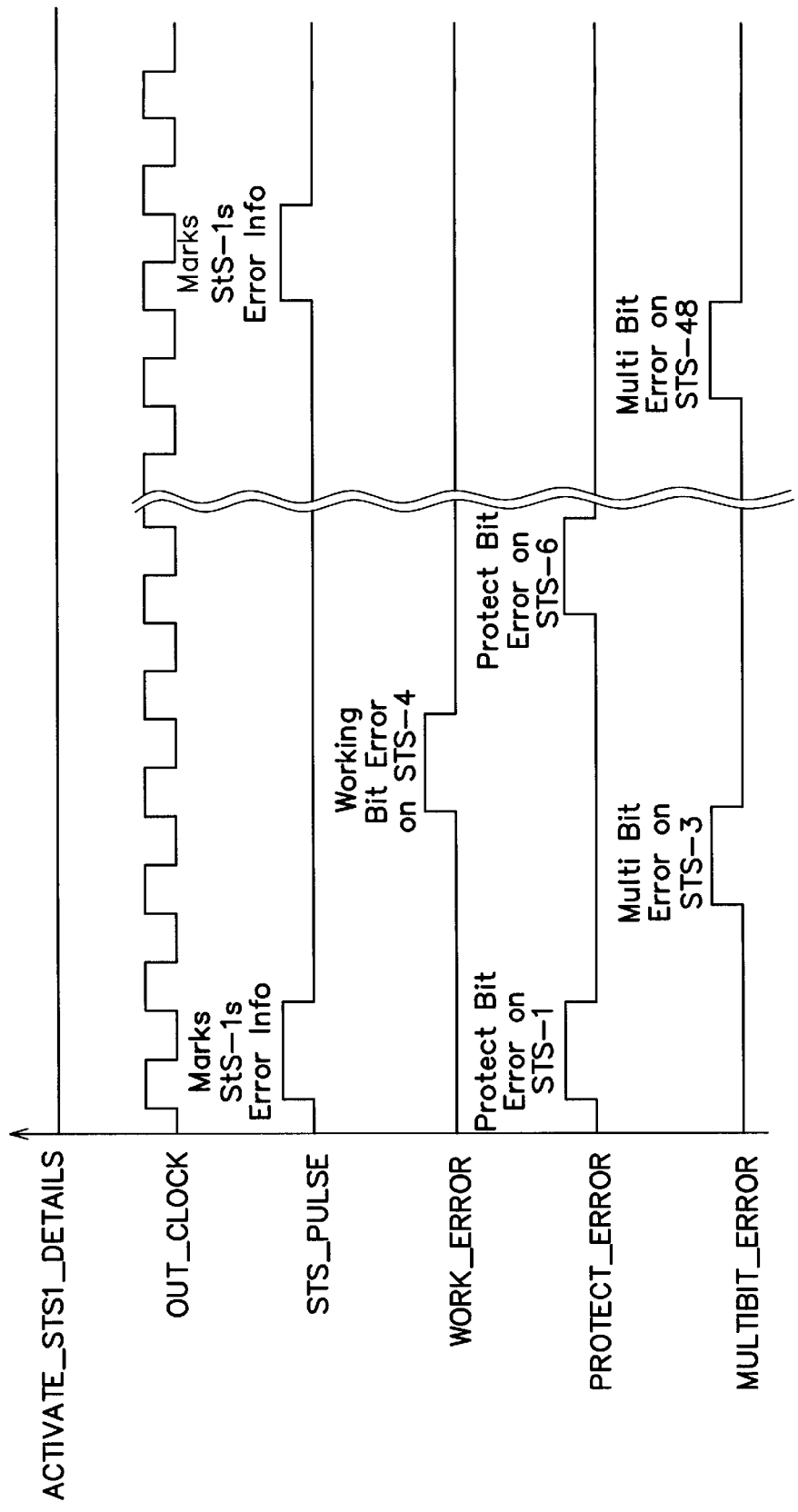
FIG. 9 shows a timing diagram associated with the system of FIG. 4 in accordance with one embodiment of the invention.

According to one embodiment of the invention, interface 419 has the following signals and timings as shown in FIG. 9:

1) ACTIVATE_STS1_DETAILS
2) OUT_CLOCK
3) STS_PULSE
4) WORK_ERROR
5) PROTECT_ERROR
6) MULTI_BIT_ERROR

According to one embodiment of the invention, the following describes example requirements of interface 419:

1) The "WORK_ERROR" signal generates a reasonably-sized pulse (frequency<78 MHz) whenever a single bit error is detected in the SONET frame that can be fixed.

This pulse will guarantee that at least the first bit error is captured in a series of bit errors such that a good estimate on the working paths quality can be obtained. This error count will only be approximate because the single error signal is not operating fast enough to capture every error correction event.

2) The "PROTECT_ERROR" signal generates a similar pulse whenever a single bit error is detected in the protect byte that can be fixed.

3) The "MULTI_BIT_ERROR" signal generates a similar pulse whenever a multiple bit error is detected that can not be fixed.

According to another embodiment of the invention, the encoder/decoder 401 optionally maintains 48-flops inside that record on which STS-1 the error occurred for a working path error; this information could be clocked out of encoder/decoder 401 over 48 clock cycles for each STS-1, as shown in FIG. 9. Protect error information and multi-bit error information can be clocked out of encoder/decoder 401 in a similar manner.

FIG. 9 shows more detailed information regarding signals of interface 419 according to one embodiment of the invention. The ACTIVATE_STS1_DETAILS signal is used to place encoder/decoder 401 in this optional STS-1 error information mode. The encoder/decoder 401 generates a >>78 MHz signal on the OUT_CLOCK signal and pulses the STS_PULSE signal once every 48 clock cycles. The information for the first STS-1 may be displayed on the first clock cycle, the STS-2's information may be displayed on the second clock cycle and so on up to STS-48. Interface 419 allows collection of information on a per STS-1 basis, which helps a user to determine where errors exist in a grooming system. It should be appreciated that there are many ways to communicate error indication information for a communication system, and that the invention is not limited to the embodiments described.

While various embodiments of the present invention have been described above, it should be understood that they have been presented by way of example only, and not limitation. Thus, the breadth and scope of the present invention are not limited by any of the above exemplary embodiments, but are defined only in accordance with the following claims and their equivalents.

What is claimed is:

1. A network communication system for transmitting data between systems comprising:
   a working data path, over which working data is transmitted by the network communication system; and
   a redundant data path, wherein the network communication system is configured to transmit error correction information and not the working data over the redundant path, the error correction information being used to correct a portion of the working data.

2. The network communication system according to claim 1, wherein the network communication system is adapted to generate the error correction information.

3. The network communication system according to claim 1, wherein the network communication system is adapted to transmit the working data, and wherein the error correction information is derived from the working data by the network communication system.

4. The network communication system according to claim 3, wherein the working data and error correction information are transmitted substantially in parallel over the working data path and redundant data path, respectively.

5. The network communication system according to claim 3, wherein the error correction information is encoded in a data frame transmitted on the redundant data path.

6. The network communication system according to claim 5, wherein the data frame is a data frame having at least one format portion of a SONET data frame.

7. The network communication system according to claim 1, wherein the transmitted error correction information is transmitted substantially in parallel with the working data from which the transmitted error correction information is derived.

8. The network communication system according to claim 1, wherein the network communication system is configured to transmit error detection information indicative of a transmission error occurring on at least one of the redundant and working data paths.

9. The network communication system according to claim 1, wherein the error correction information includes information generated by a Hamming encoding operation.

10. The network communication system according to claim 1, wherein the working data is encoded in at least one data frame transmitted on the working data path.

11. The network communication system according to claim 1, wherein the data frame has a SONET data frame format.

12. The network communication system according to claim 1, wherein the redundant data path is a SONET protection path.

13. The network communication system according to claim 1, wherein the working data is encoded in a first data frame transmitted on the working data path, the error correction information is encoded in a second data frame transmitted on the redundant data path, and wherein the communication system aligns the first and second data frames.

14. The network communication system according to claim 13, wherein a buffer is provided that aligns the first and second data frames based upon information indicating the beginning of at least one of the first and second data frames.

15. The network communication system according to claim 1, wherein the error correction information is forward error correction information.

16. The network communication system according to claim 15, wherein the forward error correction information is received by another communication system and is used to correct bit errors with data frames of the working path.

17. The network communication system according to claim 1, wherein the communication system provides a signal indicating an error on the working data path.

18. The network communication system according to claim 1, wherein the communication system provides a signal indicating an error on the redundant data path.

19. The network communication system according to claim 1, wherein the error correction information is determined for working data in data block sizes in a range of a byte level or less.

20. The network communication system according to claim 1, wherein the error correction information is used to derive a missing portion of the working data.

21. A method for encoding data comprising:
   determining, for a portion of a working data stream, error correction information derived from the portion;
   transmitting the portion of the working data stream on a first data channel; and transmitting the error correction information and not the portion on a second data channel.

22. The method according to claim 21, wherein the first data channel is configured along a working data path, and wherein the second data channel is configured along a redundant data path.

23. The method according to claim 21, wherein the determining operation comprises determining error correction information based upon the portion wherein the size of the portion is in a range of a byte or less.

24. The method according to claim 21, wherein the operations of transmitting the portion of the working data stream and transmitting error correction information are performed substantially concurrently.

25. The method according to claim 21, further comprising determining error detection information based upon the portion and the error correction information.

26. The method according to claim 22, further comprising transmitting the error detection information on the redundant path.

27. The method according to claim 21, wherein the determining operation includes determining Hamming code information determined from the portion.

28. A method for decoding data comprising:
receiving, only on a first data channel, a portion of a working data stream;
receiving, on a second data channel, error correction information derived from the portion; and
determining whether to correct data within the portion based upon the received error correction information.

29. The method according to claim 28, wherein the first data channel is configured along a working data path, and wherein the second data channel is configured along a redundant data path.

30. The method according to claim 28, further comprising performing an error correction of the portion.

31. The method according to claim 30, wherein the operation of performing an error correction of the portion is performed on a byte or less of data.

32. The method according to claim 28, wherein the operations of receiving the portion and receiving error correction information are performed substantially concurrently.

33. The method according to claim 28, further comprising:
receiving error detection information based upon the portion and the error correction information; and
accepting the received portion and error correction information based upon the error detection information.

34. A system for encoding data comprising:
an error correction generator that generates, for a portion of a working data stream, error correction information derived from the portion; and
an interface that is configured to transmit the portion of the working data stream on a first data channel, and configured to transmit the error correction information and not the portion on a second data channel.

35. The system according to claim 34, wherein the first data channel is configured along a working data path, and wherein the second data channel is configured along a redundant data path.

36. The system according to claim 34, wherein the error correction generator generates error correction information based upon the portion wherein the size of the portion is in a range of a byte or less.

37. The system according to claim 34, wherein the interface is configured to transmit the portion of the working data stream and error correction information substantially concurrently.

38. The system according to claim 37, wherein the interface transmits the error detection information on the redundant path.

39. The system according to claim 34, further comprising an error detection generator that generates error detection information based upon the portion and the error correction information.

40. The system according to claim 34, wherein the error correction generator determines Hamming code information determined from the portion.

41. A system for decoding data comprising:
an interface that receives, only on a first data channel, a portion of a working data stream and receives, on a second data channel, error correction information derived from the portion; and
a decoder that determines whether to correct data within the portion based upon the received error correction information.

42. The system according to claim 41, wherein the first data channel is configured along a working data path, and wherein the second data channel is configured along a redundant data path.

43. The system according to claim 41, wherein the decoder is configured to perform an error correction of the portion.

44. The system according to claim 43, wherein the error correction of the portion is performed by the decoder on a byte or less of data.

45. The system according to claim 41, wherein the interface receives the portion and error correction information substantially concurrently.

46. The system according to claim 41, wherein the interface is configured to receive error detection information based upon the portion and the error correction information, and wherein the decoder is configured to detect errors in the received portion and error correction information based upon the error detection information.

* * * * *